US012463349B2

(12) United States Patent
Ghalib et al.

(10) Patent No.: US 12,463,349 B2
(45) Date of Patent: Nov. 4, 2025

(54) ACTIVE STEERING FOR MILLIMETER WAVE SIGNALING

(71) Applicant: KYOCERA AVX Components (San Diego), Inc., San Diego, CA (US)

(72) Inventors: Asim Ghalib, Poway, CA (US); Zhe Wang, San Diego, CA (US); Jesse Shihchieh Hsin, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 215 days.

(21) Appl. No.: 18/324,590

(22) Filed: May 26, 2023

(65) Prior Publication Data

US 2023/0387602 A1 Nov. 30, 2023

Related U.S. Application Data

(60) Provisional application No. 63/347,282, filed on May 31, 2022.

(51) Int. Cl.
*H01Q 19/00* (2006.01)
*H01Q 5/385* (2015.01)
*H01Q 9/04* (2006.01)

(52) U.S. Cl.
CPC ........... *H01Q 19/005* (2013.01); *H01Q 5/385* (2015.01); *H01Q 9/0407* (2013.01)

(58) Field of Classification Search
CPC .... H01Q 19/005; H01Q 5/385; H01Q 9/0407; H01Q 3/24
See application file for complete search history.

(56) References Cited

U.S. PATENT DOCUMENTS 5,786,793 A * 7/1998 Maeda ............... H01Q 21/0075 343/846
6,765,536 B2 7/2004 Phillips et al.
6,987,493 B2 1/2006 Chen
(Continued)

FOREIGN PATENT DOCUMENTS

CN 107978858 5/2018
CN 112865831 A * 5/2021

OTHER PUBLICATIONS

Jen-Chich Wu et al., "Sidelobe Level Reduction in Wide-Angle Scanning Array System Using Pattern-Reconfigurable Antennas," 2010 IEEE MTT-S International Microwave Symposium, Anaheim, CA, USA, 2010, 4 pages.
(Continued)

*Primary Examiner* — Seung H Lee
(74) *Attorney, Agent, or Firm* — Dority & Manning, P.A.

(57) ABSTRACT

An antenna configured to operate at millimeter wave frequencies is provided. The antenna includes a substrate and a ground plane. The antenna includes one or more active patch antenna elements that collectively define four corners, wherein the active patch antenna element(s) are positioned on a first surface of the substrate. The antenna includes four parasitic patch elements coplanar to the active patch antenna element(s) and adjacent to each respective corner of the active patch antenna element(s). The antenna includes a switching circuit configured to dynamically couple, to the ground plane, the first parasitic patch element, the second parasitic patch element, the third parasitic patch element, and/or the fourth parasitic patch element.

12 Claims, 18 Drawing Sheets

(56) References Cited

U.S. PATENT DOCUMENTS

| | | | |
|---|---|---|---|
| 7,068,234 B2 | 6/2006 | Sievenpiper | |
| 7,215,289 B2 | 5/2007 | Harano | |
| 7,830,320 B2 | 11/2010 | Shamblin | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,648,755 B2 | 2/2014 | Rowson et al. | |
| 8,717,241 B2 | 5/2014 | Shamblin et al. | |
| 9,065,496 B2 | 6/2015 | Rowson et al. | |
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,439,151 B2 | 9/2016 | Zhu et al. | |
| 9,479,242 B2 | 10/2016 | Desclos et al. | |
| 9,590,703 B2 | 3/2017 | Desclos et al. | |
| 9,755,305 B2 | 9/2017 | Desclos et al. | |
| 9,755,580 B2 | 9/2017 | Desclos et al. | |
| 2008/0088510 A1 | 4/2008 | Murata et al. | |
| 2011/0175791 A1 | 7/2011 | Ozdemir et al. | |
| 2013/0023218 A1 | 1/2013 | Ali et al. | |
| 2016/0365632 A1* | 12/2016 | Lee | H01Q 3/446 |

OTHER PUBLICATIONS

International Search Report and Written Opinion for Application No. PCT/US2023/023738, mailed Sep. 18, 2023,12 pages.

* cited by examiner

ACTIVE STEERING FOR MILLIMETER WAVE SIGNALING

PRIORITY CLAIM

The present application is based on and claims priority to U.S. Provisional Application No. 63/347,282, titled "ACTIVE STEERING FOR MILLIMETER WAVE SIGNALING," having a filing date of May 31, 2022, which is incorporated by reference herein.

FIELD

The present disclosure relates generally to an antenna configured to operate at millimeter wave frequencies, and more particularly to a millimeter wave patch antenna with active beam steering.

BACKGROUND

Antennas can be used to facilitate wireless communication between devices. Recent advances in telecommunications have enabled communications using millimeter wave frequency bands between about 24 Ghz and about 300 Ghz. As such, antenna devices capable of communicating at such frequencies are greatly desired.

SUMMARY

Aspects and advantages of embodiments of the present disclosure will be set forth in part in the following description, or may be learned from the description, or may be learned through practice of the embodiments.

One example aspect of the present disclosure is directed to an antenna configured to operate at millimeter wave frequencies. The antenna includes a substrate comprising a first surface and a second surface. The antenna includes a ground plane, wherein a first surface of the ground plane contacts the second surface of the substrate. The antenna includes an active patch antenna element that defines a first corner, a second corner, a third corner, and a fourth corner, wherein the active patch antenna element is positioned on the first surface of the substrate, wherein the active patch antenna is configured to generate a radiation pattern. The antenna includes a first parasitic patch element coplanar to the active patch antenna element, wherein a corner of the first parasitic patch element is adjacent to the first corner of the active patch antenna element. The antenna includes a second parasitic patch element coplanar to the active patch antenna element, wherein a corner of the first parasitic patch element is adjacent to the second corner of the active patch antenna element. The antenna includes a third parasitic patch element coplanar to the active patch antenna element, wherein a corner of the first parasitic patch element is adjacent to the third corner of the active patch antenna element. The antenna includes a fourth parasitic patch element coplanar to the active patch antenna element, wherein a corner of the first parasitic patch element is adjacent to the fourth corner of the active patch antenna element. The antenna includes a switching circuit configured to dynamically couple, to the ground plane, the first parasitic patch element, the second parasitic patch element, the third parasitic patch element, and/or the fourth parasitic patch element.

Another example aspect of the present disclosure is directed to a antenna configured to operate at millimeter wave frequencies, The antenna includes a substrate comprising a first surface and a second surface. The antenna includes a ground plane, wherein a first surface of the ground plane contacts the second surface of the substrate. The antenna includes a plurality of active patch antenna elements disposed upon the first surface of the substrate, wherein the plurality of active patch antenna elements collectively form a two-dimensional shape defining a plurality of vertices, wherein each of the plurality of active patch antenna elements is configured to generate a radiation pattern. The antenna includes a plurality of parasitic patch elements coplanar to the plurality of active patch antenna elements, wherein each of the plurality of parasitic patch elements defines four vertices, wherein a vertex of each of the plurality of parasitic patch antenna elements is adjacent to a vertex of the two-dimensional shape of the plurality of active patch antenna elements. The antenna includes a switching circuit configured to dynamically couple, to the ground plane, one or more of the plurality of parasitic patch elements.

Another example aspect of the present disclosure is directed to a method for generation of millimeter wave frequencies. The method includes generating, by an antenna device, a radiation pattern comprising a transmission to a receiving entity, wherein the antenna device comprises a substrate, a ground plane contacting a first surface of the substrate, and an active antenna patch element and four parasitic patch elements disposed upon a second surface of the substrate, wherein the active antenna patch element defines four corners, and wherein each of the four parasitic patch elements are positioned coplanar and adjacent to a respective corner of the four corners of the active antenna patch element. The method includes obtaining, by an antenna device via a single coaxial cable, information indicative of one or more channel quality indicators corresponding to the transmission to the receiving entity. The method includes, based at least in part on the information, controlling, by the antenna device, a switching circuit to dynamically couple one or more of the four parasitic patch antenna elements to the ground plane of the antenna device.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 3B plots frequency along the horizontal axis and reflection coefficient (S 11) along the vertical axis;

FIG. 4B plots frequency along the horizontal axis and reflection coefficient (S 11) along the vertical axis;

FIG. 7B plots frequency along the horizontal axis and reflection coefficient (S 11) along the vertical axis;

FIG. 8B plots frequency along the horizontal axis and reflection coefficient (S 11) along the vertical axis;

DETAILED DESCRIPTION

Figure 1A:
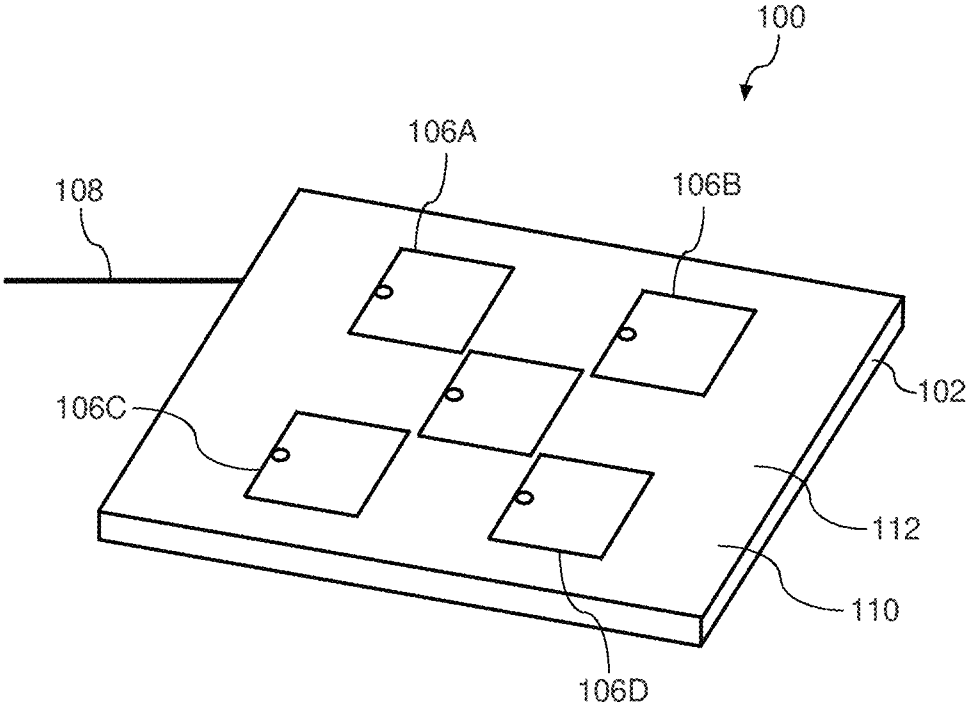
FIG. 1A depicts an example antenna 100 configured to operate at millimeter wave frequencies according to some embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a millimeter wave patch antenna assembly. In some antenna applications, such as those utilizing millimeter wave frequencies, it can be useful to have an antenna or patch antenna element that can provide active beam steering for optimizing or enhancing transmission quality and efficiency.

For instance, in one example, it can be useful to provide an active patch antenna element that generates an millimeter wave radiation pattern steerable by coplanar parasitic patch antenna elements adjacent to vertices of the active patch antenna element. In conjunction, data over coax (DOC) technology can be leveraged to provide both transmission data and a control signal that dynamically couples the parasitic patch antenna elements adjacent to the active patch antenna element to actively steer the radiation pattern of the active antenna element. In such fashion, DOC technology can be leveraged alongside millimeter wave technologies to provide patch antenna assemblies capable of beam steering at millimeter wave frequency bands.

According to example aspects of the present disclosure, an antenna assembly can include a substrate (e.g., a circuit board) having a first surface and an opposing second surface. The antenna assembly can include a ground plane. The first surface of the ground plane can contact the second surface of the substrate. The antenna assembly can include an active patch antenna element positioned on the first surface of the substrate. Additionally, the antenna assembly can include a plurality of parasitic patch elements adjacent to vertices of the active patch antenna element. In some embodiments, the antenna assembly can include two or more active patch antenna elements that collectively form a two-dimensional shape that defines a plurality of vertices.

One example aspect of the present disclosure is directed to an antenna configured to operate at millimeter wave frequencies. The antenna includes a substrate comprising a first surface and a second surface. The antenna includes a ground plane, wherein a first surface of the ground plane contacts the second surface of the substrate. The antenna includes an active patch antenna element that defines a first corner, a second corner, a third corner, and a fourth corner, wherein the active patch antenna element is positioned on the first surface of the substrate, wherein the active patch antenna is configured to generate a radiation pattern. The antenna includes a first parasitic patch element coplanar to the active patch antenna element, wherein a corner of the first parasitic patch element is adjacent to the first corner of the active patch antenna element. The antenna includes a second parasitic patch element coplanar to the active patch antenna element, wherein a corner of the first parasitic patch element is adjacent to the second corner of the active patch antenna element. The antenna includes a third parasitic patch element coplanar to the active patch antenna element, wherein a corner of the first parasitic patch element is adjacent to the third corner of the active patch antenna element. The antenna includes a fourth parasitic patch element coplanar to the active patch antenna element, wherein a corner of the first parasitic patch element is adjacent to the fourth corner of the active patch antenna element. The antenna includes a switching circuit configured to dynamically couple, to the ground plane, the first parasitic patch element, the second parasitic patch element, the third parasitic patch element, and/or the fourth parasitic patch element.

In some embodiments, the first, second, third, and fourth parasitic patch elements are respectively within a distance of the first, second, third and fourth corners of the active patch antenna elements.

In some embodiments, the distance comprises a maximum distance of $$\frac{\lambda}{2}.$$

In some embodiments, the antenna further comprises a control circuit configured to control the switching circuit.

In some embodiments, the control circuit is configured to receive data over a single coaxial cable.

In some embodiments, the data over the single coaxial cable is descriptive of control instructions for the control circuit.

In some embodiments, each of the first, second, third, and fourth parasitic patch elements are configured to reflect the radiation pattern of the active patch antenna element when disconnected from the ground plane.

In some embodiments, the control circuit is configured to control the switching circuit to dynamically couple the first, second, third, and/or the fourth parasitic patch elements to the ground plane based at least in part on one or more channel quality indicators (CQIs).

In some embodiments, the one or more CQIs are indicative of a quality of connection between the antenna and one or more receiving entities.

In some embodiments, the one or more CQIs are associated with a connection between the antenna and a receiving entity positioned closest to the first and third parasitic patch elements. Responsive to the one or more CQIs, the control circuit is configured to control the switching circuit to dynamically couple the first and third parasitic patch elements to the ground plane.

In some embodiments, the antenna further comprises a second active patch antenna element configured to generate a second radiation pattern positioned on the first surface of the substrate, wherein a first corner and a second corner of the second active patch antenna element are respectively adjacent to the third corner and the fourth corner of the active patch antenna element. The third parasitic patch element is adjacent to a third corner of the second active patch antenna element, and the fourth parasitic patch element is adjacent to a fourth corner of the second active patch antenna element.

In some embodiments, a shape of the first parasitic patch antenna element is identical to a shape of the second parasitic patch antenna element, the third parasitic patch antenna element, and the fourth parasitic patch antenna element.

In some embodiments, the radiation pattern comprises a frequency between about 24 Ghz and about 300 Ghz. As used herein, the use of the term "about" in conjunction with a numerical value is intended to refer to within 15% of the stated amount.

Another example aspect of the present disclosure is directed to method for generation of millimeter wave frequencies. The method includes generating, by an antenna device, a radiation pattern comprising a transmission to a receiving entity, wherein the antenna device comprises a substrate, a ground plane contacting a first surface of the substrate, and an active antenna patch element and four parasitic patch elements disposed upon a second surface of the substrate, wherein the active antenna patch element defines four corners, and wherein each of the four parasitic patch elements are positioned coplanar and adjacent to a respective corner of the four corners of the active antenna patch element. The method includes obtaining, by an antenna device via a single coaxial cable, information indicative of one or more channel quality indicators corresponding to the transmission to the receiving entity. The method includes, based at least in part on the information, controlling, by the antenna device, a switching circuit to dynamically couple one or more of the four parasitic patch antenna elements to the ground plane of the antenna device.

With reference now to the Figures, example embodiments of the present disclosure will now be set forth.

FIG. 1A depicts an example antenna 100 configured to operate at millimeter wave frequencies according to some embodiments of the present disclosure. Antenna 100 includes a substrate and ground plane 102. Specifically, as illustrated in FIG. 1B, the antenna 100 includes a substrate 102A and a ground plane 102B.

Figure 1B:
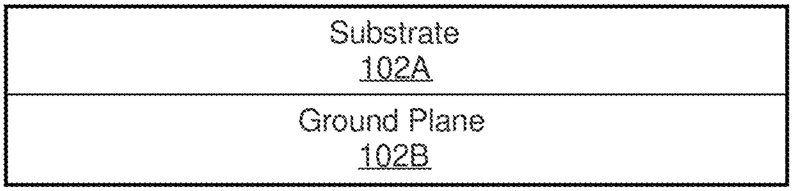
FIG. 1B depicts a side view of the antenna illustrated in FIG. 1 according to some embodiments of the present disclosure.

Turning to FIG. 1B, the substrate 102A includes a top surface 103A and a bottom surface 103B. In some embodiments, the substrate 102A may be or otherwise include a circuit board (e.g., a printed circuit board), a circuit board substrate, a material deposited upon a substrate, etc. The bottom surface 103B of the substrate contacts the top surface of the ground plane 102B. In some embodiments, the ground plane 102B and the substrate 102A collectively form a circuit board.

Returning to FIG. 1A, the antenna 100 includes an active patch antenna element 104. The active patch antenna element 104 is positioned on the first surface 103A of the substrate 102A. Additionally, the antenna includes a plurality of parasitic patch elements 106A, 106B, 106C, 106D, etc. In some embodiments, as depicted, the active patch antenna element 104 defines a first corner, a second corner, a third corner, and a fourth corner. For example, the depicted active patch antenna element 104 includes a first corner that is a top-left corner, a second corner that is a top-right corner, a third corner that is a bottom-left corner, and a fourth corner that is a bottom-right corner. Each of the four parasitic patch elements 106A-106D are coplanar to the active patch antenna element 104, and are respectively positioned adjacent to the four corners of the active patch antenna element 104. For example, the first parasitic patch element 106A (e.g., the depicted top-left parasitic patch element) can be positioned adjacent to the first corner of the active patch antenna element 104, the second parasitic patch element 106B (e.g., the depicted top-right parasitic patch element)

can be positioned adjacent to the second corner of the active patch antenna element 104, the third parasitic patch element 106C (e.g., the depicted bottom-left parasitic patch element) can be positioned adjacent to the third corner of the active patch antenna element 104, and the fourth parasitic patch element 106D (e.g., the depicted bottom-right parasitic patch element) can be positioned adjacent to the first corner of the active patch antenna element 104.

In some embodiments, one or more of the parasitic patch elements 106A-106D are positioned adjacent to and a certain distance away from a respective corner of the active patch antenna element 104 (e.g., not contacting the active patch antenna element 104). In some embodiments, the distance has a maximum distance of $$\frac{\lambda}{2}.$$

The active patch antenna element 104 is configured to generate a radiation pattern (e.g., to transmit data, etc.). Specifically, the active patch antenna element 104 is configured to generate radiation patterns in a millimeter wave frequency band (e.g., 3 Ghz-300 Ghz). In some embodiments, data to be transmitted via the radiation pattern can be carried to the antenna 100 via a single coaxial cable 108. Additionally, in some embodiments, the antenna 100 may leverage data-over-coax (DOC) technology to obtain both data and control data over the single coaxial cable 108.

Each of the parasitic patch elements 106A-106D are configured to reflect the radiation pattern of the active patch antenna element 104 when disconnected from the ground plane 102B. When coupled to the ground plane 102B, a parasitic patch element 106 ceases to reflect the radiation pattern generated by the active patch antenna element 104. In such fashion, by dynamically coupling parasitic patch elements 106 adjacent to the active patch antenna element 104, the beam of the antenna 100 can be dynamically steered.

The antenna includes a switching circuit 110 configured to dynamically couple one or more of the parasitic patch elements 106A-106D. In some embodiments, the antenna 100 includes a control circuit 112 configured to control the switching circuit. In some embodiments, the control circuit 112 may be configured to receive control data via the single coaxial cable. For example, the control data obtained via the single coaxial cable 108 may include or otherwise describe control instructions for the control circuit. Alternatively, in some embodiments, the control data may include Channel Quality Indicators (CQIs) associated with a quality of the radiation pattern generated by the active patch antenna element 104 (e.g., indicative of a quality of connection between the antenna 100 and one or more receiving entities). In some embodiments, based on the CQIs, the control circuit 112 may control the switching circuit to dynamically couple or uncouple the parasitic patch antenna elements 106 from the ground plane 102B.

As an example, the single coaxial cable 108 may provide control data including one or more CQIs associated with a connection between the antenna 100 and a receiving entity positioned closest to the first parasitic patch element 106A and the third parasitic patch element 106C. Responsive to the one or more CQIs, the control circuit 112 can be configured to control the switching circuit 110 to dynamically couple the first parasitic patch element 106A and the third parasitic patch element 106C to the ground plane 102B, therefore dynamically disabling any signal reflectance of the first parasitic patch element 106A and the third parasitic patch element 106C. In such fashion, by dynamically disabling first parasitic patch element 106A and the third parasitic patch element 106C, the beam of radiation generated by the active patch antenna element 104 can be steered towards the receiving entity, therefore improving signal quality.

It should be noted that, although FIG. 1A illustrates an antenna with one active antenna patch element, embodiments of the present disclosure are not limited to utilization of one active antenna patch element. Embodiments that utilize a plurality of active patch antenna elements will be discussed with regards to FIG. 5.

Figure 2A:
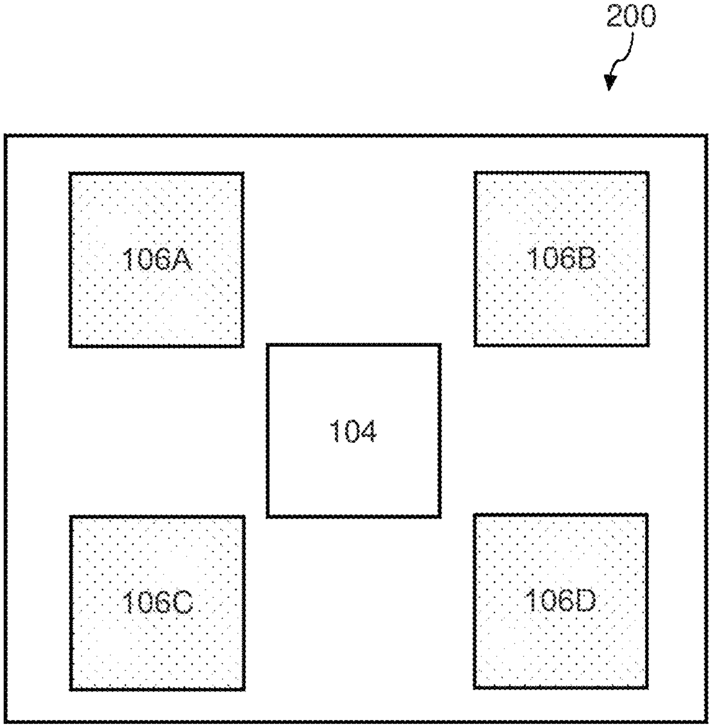
FIG. 2A illustrates a block diagram of the antenna of FIG. 1 for a first parasitic patch element grounding configuration according to some embodiments of the present disclosure.

FIG. 2A illustrates a block diagram of the antenna 100 of FIG. 1 for a first parasitic patch element grounding configuration according to some embodiments of the present disclosure. As each of the plurality of parasitic patch elements 106 are coupled to the ground plane 102B, there is no active reflectance of the radiation pattern of the active patch antenna element 104 by any parasitic patch element 106.

Figure 2B:
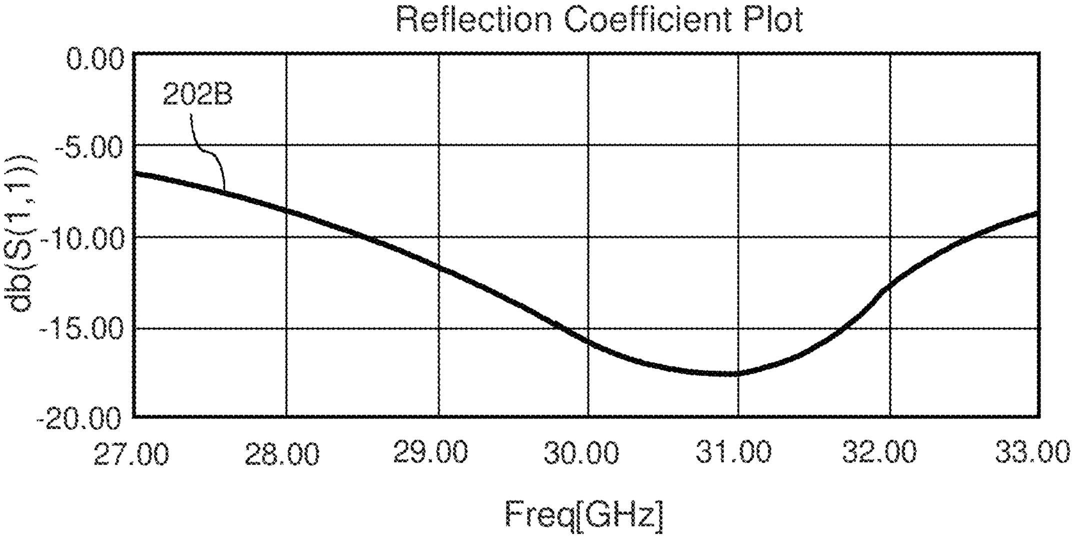
FIGS. 2B and 2C illustrate an example radiation pattern and associated performance metrics for the parasitic patch grounding configuration illustrated in FIG. 2A according to some embodiments of the present disclosure.

FIG. 2B depicts an example reflection coefficient plot 202B according to example aspects of the present disclosure. FIG. 2B plots frequency along the horizontal axis and reflection coefficient (S 11) along the vertical axis.

Figure 2C:
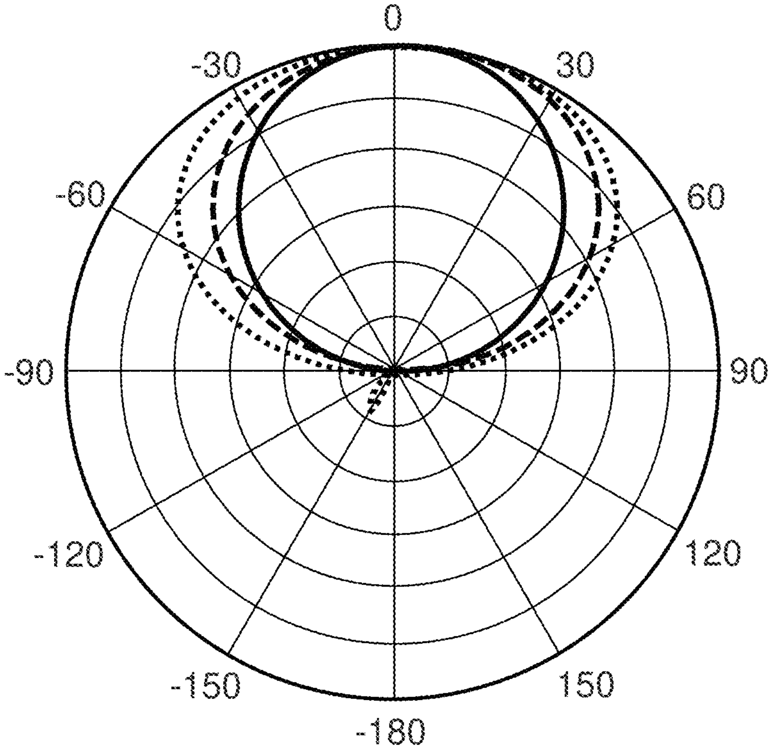

FIG. 2C depicts example radiation patterns 202C of normal realized gain in the YZ plane at a frequency of, for instance, 31 GHz.

Figure 2D:
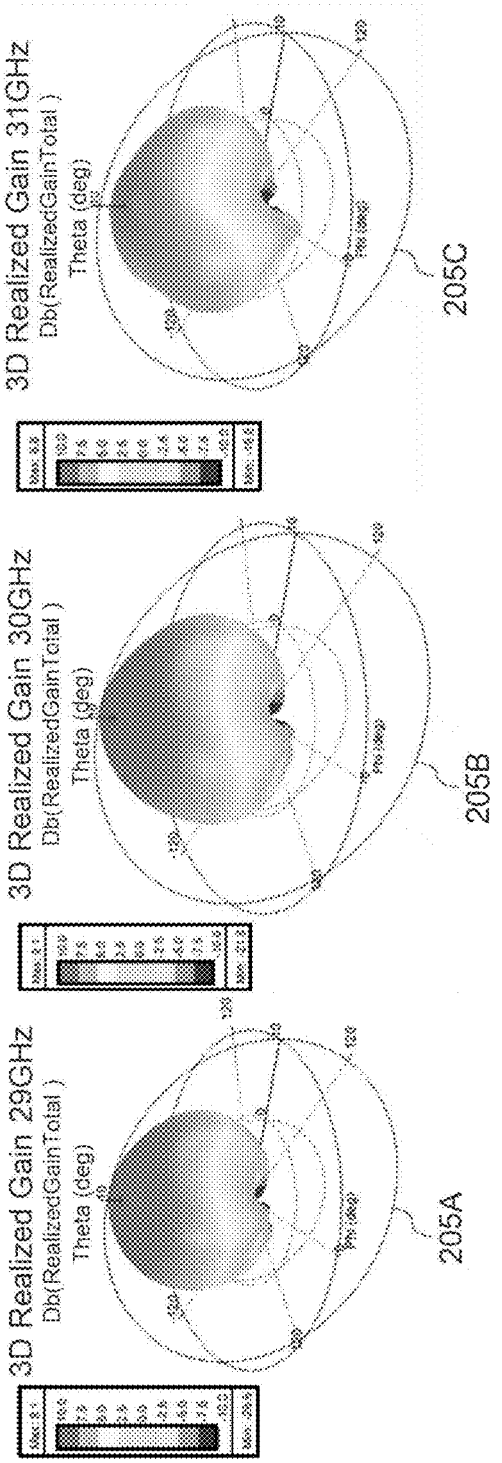
FIG. 2D depicts three-dimensional views of a radiation pattern of the antenna 300 of FIG. 2A at 29 GHz, 30 GHz, and 31 GHz respectively.

FIG. 2D depicts three-dimensional views 205A-205C of a radiation pattern of the antenna 200 of FIG. 2A at 29 GHz, 30 GHz, and 31 GHz respectively.

Figure 3A:
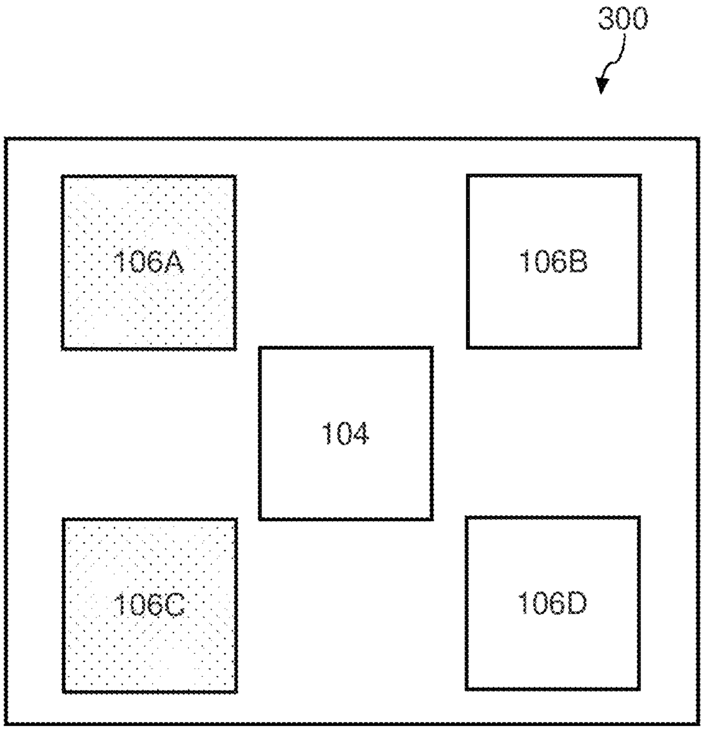
FIG. 3A illustrates a block diagram of an antenna configuration for the antenna of FIG. 1 for a second parasitic patch element grounding configuration according to some embodiments of the present disclosure.

FIG. 3A illustrates a block diagram of an antenna configuration 300 for the antenna 100 of FIG. 1 for a second parasitic patch element grounding configuration according to some embodiments of the present disclosure. Specifically, as depicted, the second and fourth parasitic patch elements 106B and 106D of the antenna 100 are de-coupled from the ground plane 102B of the antenna 100 (e.g., via the switching circuit, etc.), and are therefore not reflecting the radiation pattern of the active patch antenna element 104. Conversely, the first and third parasitic patch elements 106A and 106C are dynamically coupled to the ground plane, and are therefore actively reflecting the radiation pattern of the active patch antenna element 104. In such fashion, the radiation pattern of the active patch antenna element 104 can be dynamically steered in a certain direction.

Figure 3B:
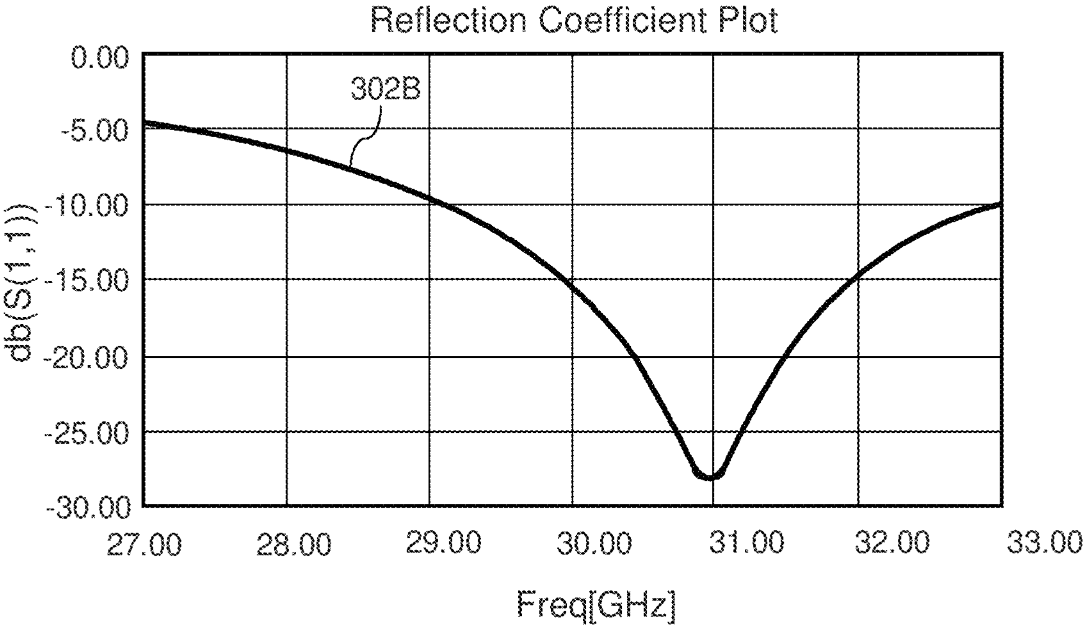
FIG. 3B depicts an example reflection coefficient plot according to example aspects of the present disclosure.

FIG. 3B depicts an example reflection coefficient plot 302B according to example aspects of the present disclosure. FIG. 3B plots frequency along the horizontal axis and reflection coefficient (S 11) along the vertical axis.

Figure 3C:
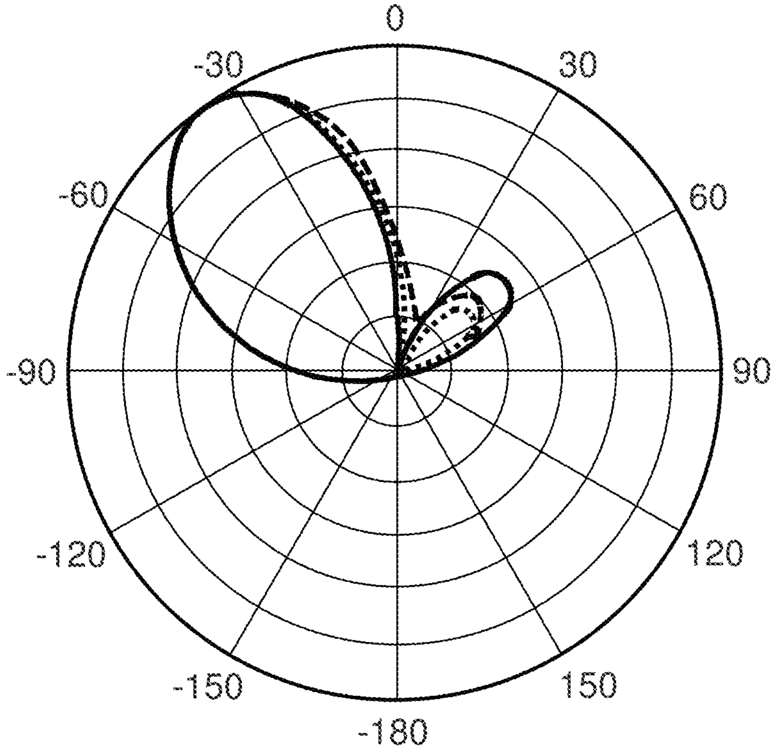
FIG. 3C depicts example radiation patterns of normal realized gain in the YZ plane at a frequency of, for instance, 31 GHz.

FIG. 3C depicts example radiation patterns 302C of normal realized gain in the YZ plane at a frequency of, for instance, 31 GHz.

Figure 3D:
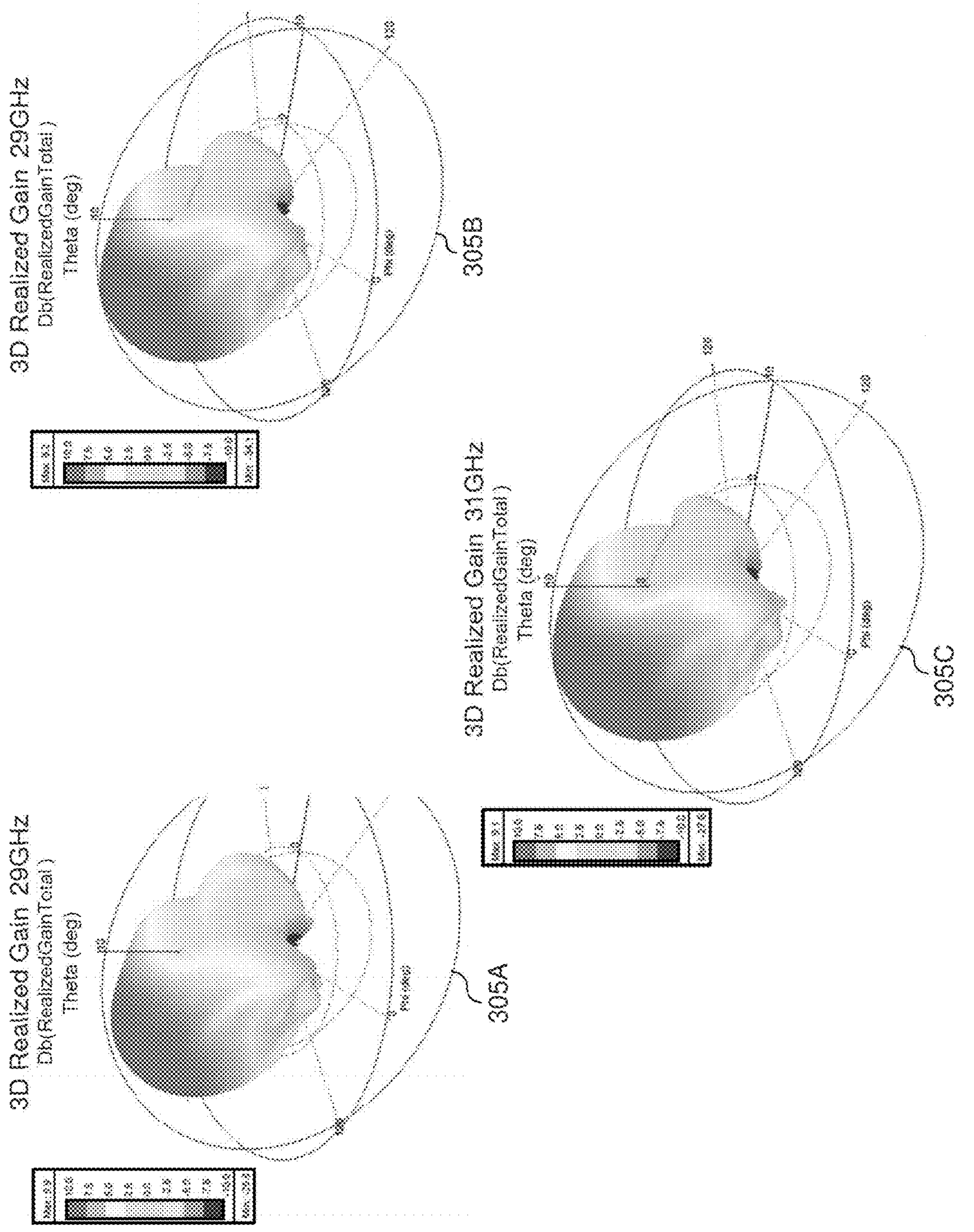
FIG. 3D depicts three-dimensional views of a radiation pattern of the antenna 300 of FIG. 3A at 29 GHz, 30 GHz, and 31 GHz respectively.

FIG. 3D depicts three-dimensional views 305A-305C of a radiation pattern of the antenna 300 of FIG. 3A at 29 GHz, 30 GHz, and 31 GHz respectively.

Figure 4A:
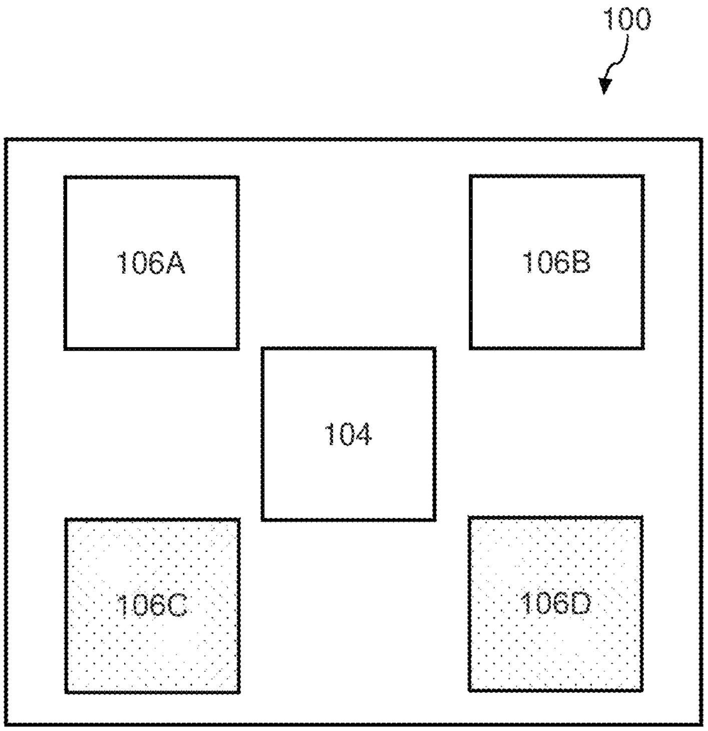
FIG. 4A illustrates a block diagram of an antenna configuration for the antenna of FIG. 1 for a third parasitic patch element grounding configuration according to some embodiments of the present disclosure.

FIG. 4A illustrates a block diagram of an antenna configuration 400 for the antenna 100 of FIG. 1 for a third parasitic patch element grounding configuration according to some embodiments of the present disclosure. Specifically, as depicted, the third and fourth parasitic patch elements 106C and 106D of the antenna 100 are de-coupled from the ground plane 102B of the antenna 100 (e.g., via the switching circuit, etc.), and are therefore not reflecting the radiation pattern of the active patch antenna element 104. Conversely, the first and third parasitic patch elements 106A and 106B are dynamically coupled to the ground plane, and are therefore actively reflecting the radiation pattern of the active patch antenna element 104. In such fashion, the radiation pattern of the active patch antenna element 104 can be dynamically steered in a certain direction.

Figure 4B:
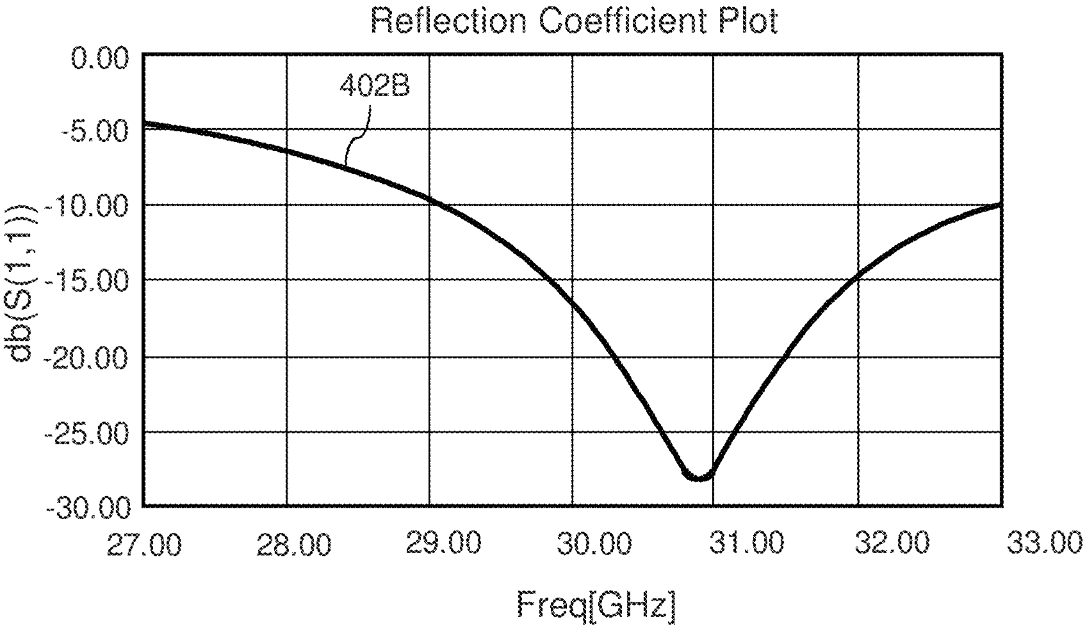
FIG. 4B depicts an example reflection coefficient plot according to example aspects of the present disclosure.

FIG. 4B depicts an example reflection coefficient plot 402B according to example aspects of the present disclosure. FIG. 4B plots frequency along the horizontal axis and reflection coefficient (S 11) along the vertical axis.

Figure 4C:
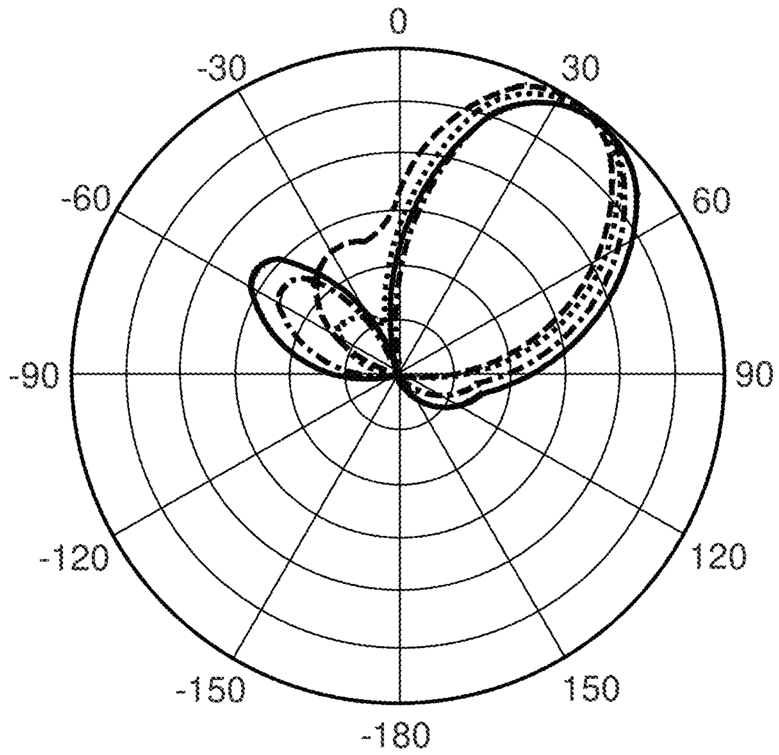
FIG. 4C depicts example radiation patterns of normal realized gain in the YZ plane at a frequency of, for instance, 31 GHz.

FIG. 4C depicts example radiation patterns 402C of normal realized gain in the YZ plane at a frequency of, for instance, 31 GHz.

Figure 4D:
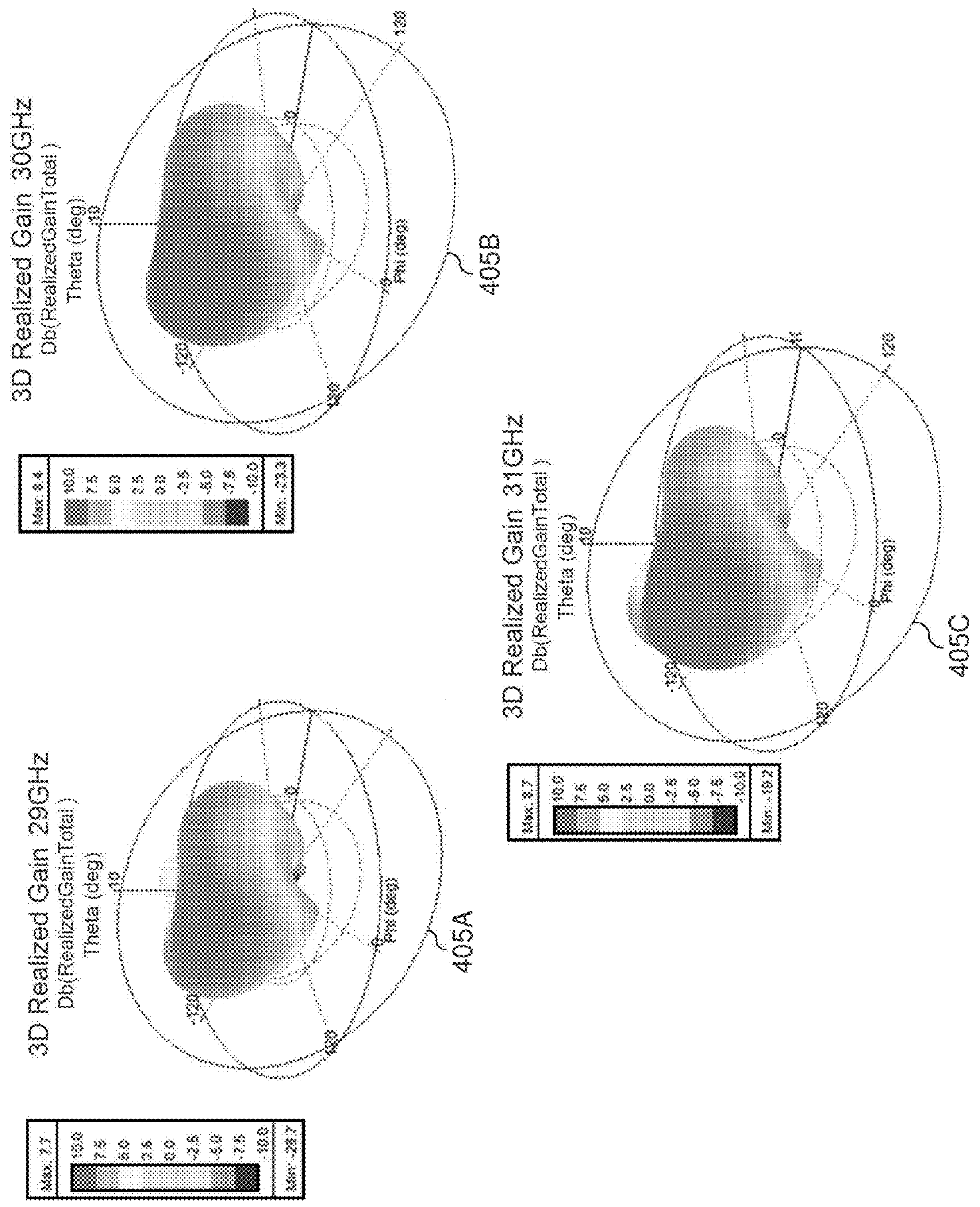
FIG. 4D depicts three-dimensional views of a radiation pattern of the antenna 400 of FIG. 4A at 29 GHz, 30 GHz, and 31 GHz respectively.

FIG. 4D depicts three-dimensional views 405A-405C of a radiation pattern of the antenna 400 of FIG. 4A at 29 GHz, 30 GHz, and 31 GHz respectively.

Figure 5:
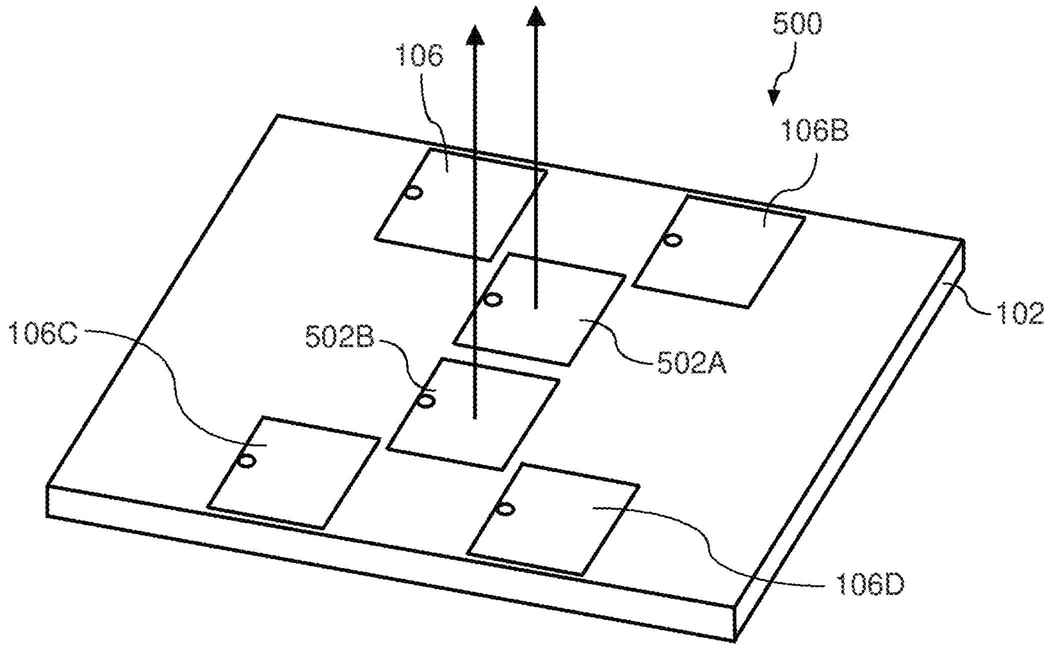
FIG. 5 depicts an example antenna configured to operate at millimeter wave frequencies according to some other embodiments of the present disclosure.

FIG. 5 depicts an example antenna 500 configured to operate at millimeter wave frequencies according to some other embodiments of the present disclosure. Specifically, antenna 500 includes two active patch antenna elements 502A and 502B. However, it should be noted that embodiments of the present disclosure are not limited to one active patch antenna element, as illustrated in FIG. 1, or two active patch antenna elements as illustrated in FIG. 5. For example, the antenna 500 may include any plurality of active patch antenna elements 502 disposed upon the first surface 103A of the substrate 102A. The plurality of active patch antenna elements 502 can be disposed to collectively form a two-dimensional shape defining a plurality of vertices (e.g., corners of a rectangle, a rhombus, a polygon, etc.). Each of the plurality of active patch antenna elements 502 can be configured to generate a radiation pattern.

It should also be noted that a degree of space 504 may exist between the active patch antenna elements 502A and 502B. For example, the space 504 between the active patch antenna elements 502A and 502B may be less than $$\frac{\lambda}{2}.$$

In conjunction, a plurality of parasitic elements 106 can be positioned coplanar and adjacent to the plurality of active patch antenna elements 502. Specifically, each of the plurality of parasitic patch elements defines four vertices (e.g., a square with four corners). The plurality of parasitic elements 106 can be positioned such that a vertex of each of the plurality of parasitic elements 106 is adjacent to a vertex of the two-dimensional shape of the plurality of active patch antenna elements 502.

As an example, active patch antenna elements 502A and 502B are disposed such that a two-dimensional shape is formed (e.g., a rectangle). Each of the four parasitic patch antenna elements 106A-106D are positioned such that a vertex of each parasitic patch antenna element 106A-106D is adjacent to a vertex of the two-dimensional shape (e.g., the rectangle) formed by active patch antenna elements 502A/502B.

Figure 6A:
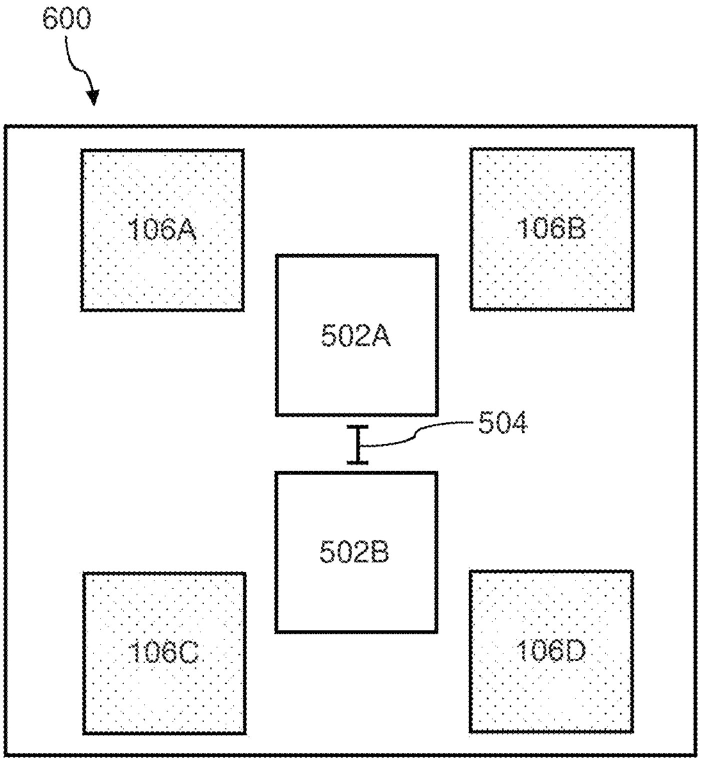
FIG. 6A illustrates a block diagram of an antenna configuration for the antenna of FIG. 5 for a parasitic patch element grounding configuration in which each parasitic patch element is coupled to the ground plane according to some embodiments of the present disclosure.

FIG. 6A illustrates a block diagram of an antenna configuration 600 for the antenna 500 of FIG. 5 for a parasitic patch element grounding configuration in which each parasitic patch element 106 is coupled to the ground plane according to some embodiments of the present disclosure. As each of the plurality of parasitic patch elements 106 are coupled to the ground plane 102B, there is no active reflectance of the radiation pattern of the active patch antenna elements 502 by any parasitic patch element 106.

Figure 6B:
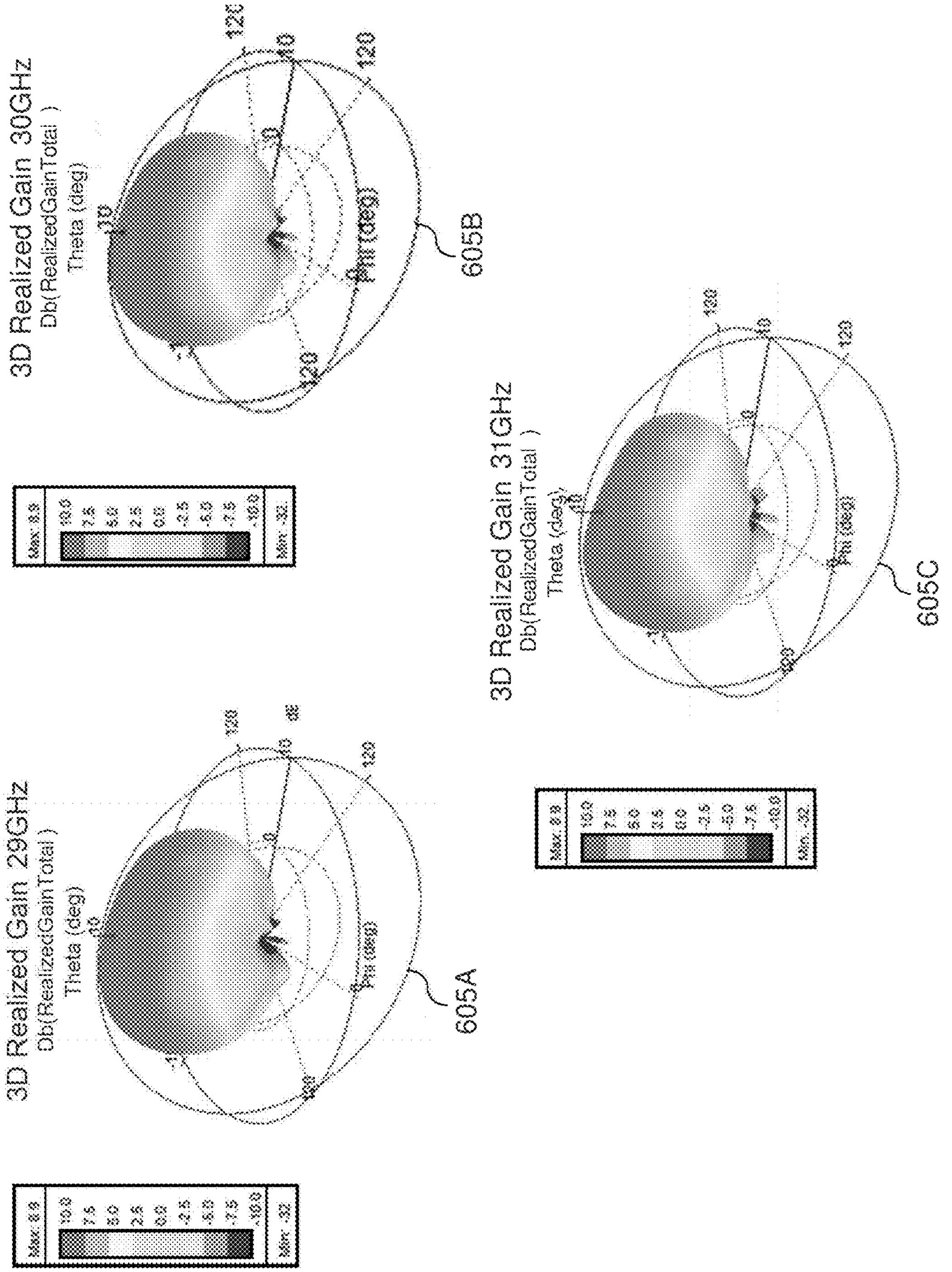
FIG. 6B depicts three-dimensional views of a radiation pattern of the antenna of FIG. 6A at 29 GHz, 30 GHz, and 31 GHz respectively.

FIG. 6B depicts three-dimensional views 605A-605C of a radiation pattern of the antenna 600 of FIG. 6A at 29 GHz, 30 GHz, and 31 GHz respectively.

Figure 7A:
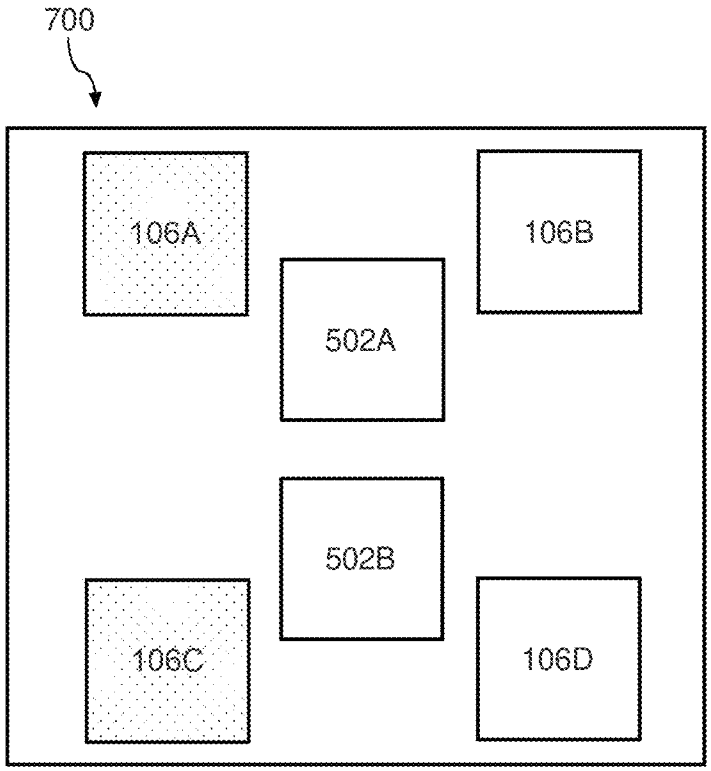
FIG. 7A illustrates a block diagram of an antenna configuration for the antenna of FIG. 5 for a parasitic patch element grounding configuration in which a subset of the parasitic patch elements are coupled to the ground plane according to some embodiments of the present disclosure.
Figure 7B:
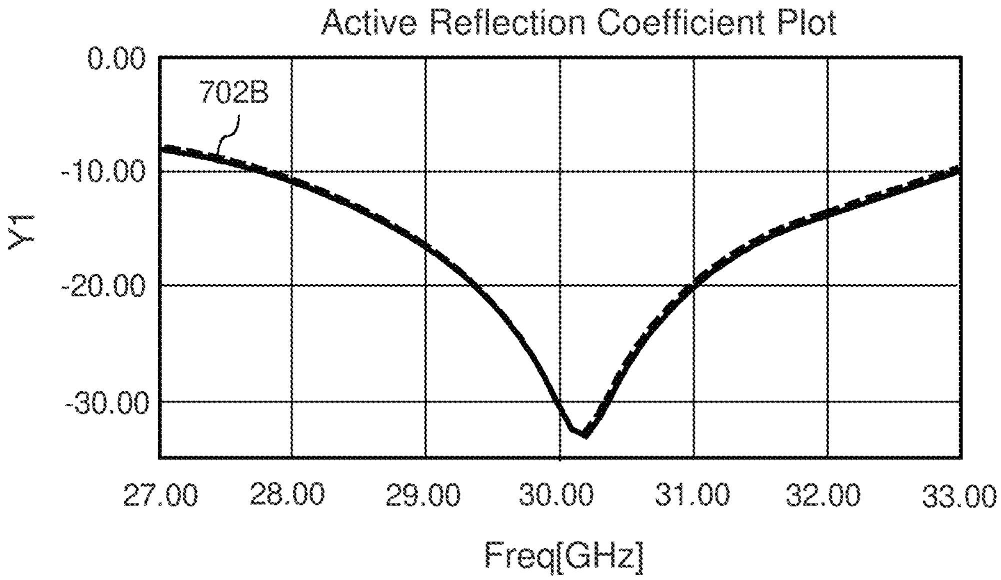
FIG. 7B depicts an example reflection coefficient plot according to example aspects of the present disclosure.

FIG. 7A illustrates a block diagram of an antenna configuration 700 for the antenna 500 of FIG. 5 for a parasitic patch element grounding configuration in which a subset of the parasitic patch elements 106 are coupled to the ground plane according to some embodiments of the present disclosure. As only a subset of the plurality of parasitic patch elements 106 are coupled to the ground plane 102B, there is active reflectance of the radiation pattern of the active patch antenna elements 502 by the active parasitic patch elements 106B and 106D (e.g., those not connected to ground). FIG. 7B illustrates an example radiation pattern and associated performance metrics for the parasitic patch grounding configuration illustrated in FIG. 7A according to some embodiments of the present disclosure.

FIG. 7B depicts an example reflection coefficient plot 702B according to example aspects of the present disclosure. FIG. 7B plots frequency along the horizontal axis and reflection coefficient (S 11) along the vertical axis.

Figure 7C:
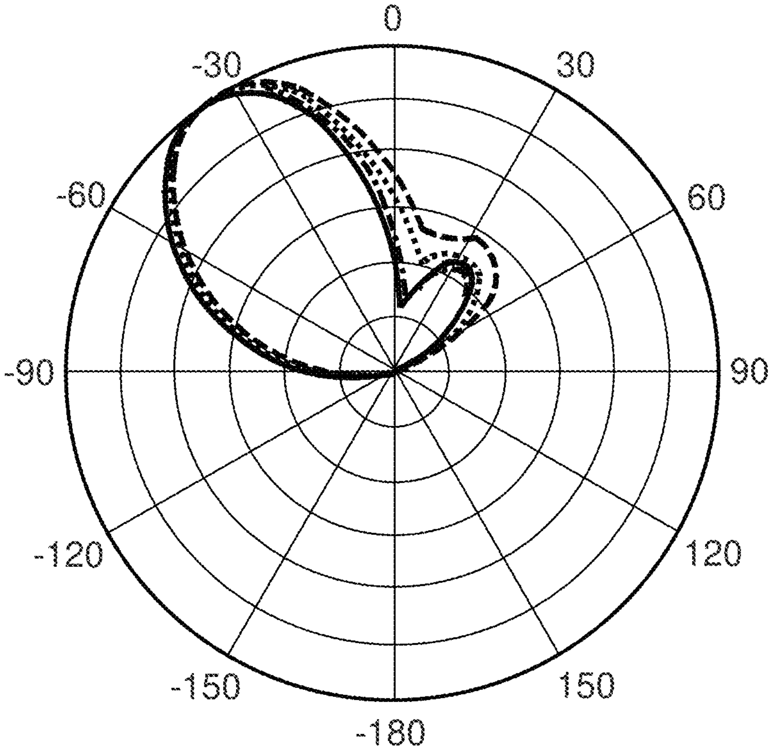
FIG. 7C depicts example radiation patterns of normal realized gain in the YZ plane at a frequency of, for instance, 31 GHz.

FIG. 7C depicts example radiation patterns 702C of normal realized gain in the YZ plane at a frequency of, for instance, 31 GHz.

Figure 8A:
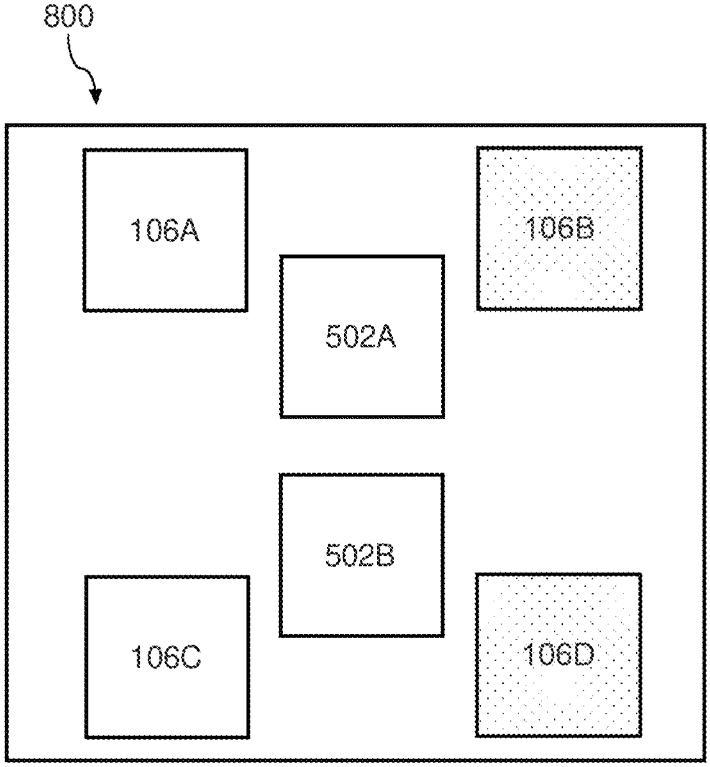
FIG. 8A illustrates a block diagram of an antenna configuration for the antenna of FIG. 5 for a parasitic patch element grounding configuration in which a different subset of the parasitic patch elements are coupled to the ground plane according to some other embodiments of the present disclosure.

FIG. 8A illustrates a block diagram of an antenna configuration 800 for the antenna 500 of FIG. 5 for a parasitic patch element grounding configuration in which a different subset of the parasitic patch elements 106 are coupled to the ground plane according to some other embodiments of the present disclosure. As only a subset of the plurality of parasitic patch elements 106 are coupled to the ground plane 102B, there is active reflectance of the radiation pattern of the active patch antenna elements 502 by the active parasitic patch elements 106A and 106C (e.g., those not connected to ground). FIG. 7D illustrates an example radiation pattern and associated performance metrics for the parasitic patch grounding configuration illustrated in FIG. 7C according to some embodiments of the present disclosure.

Figure 8B:
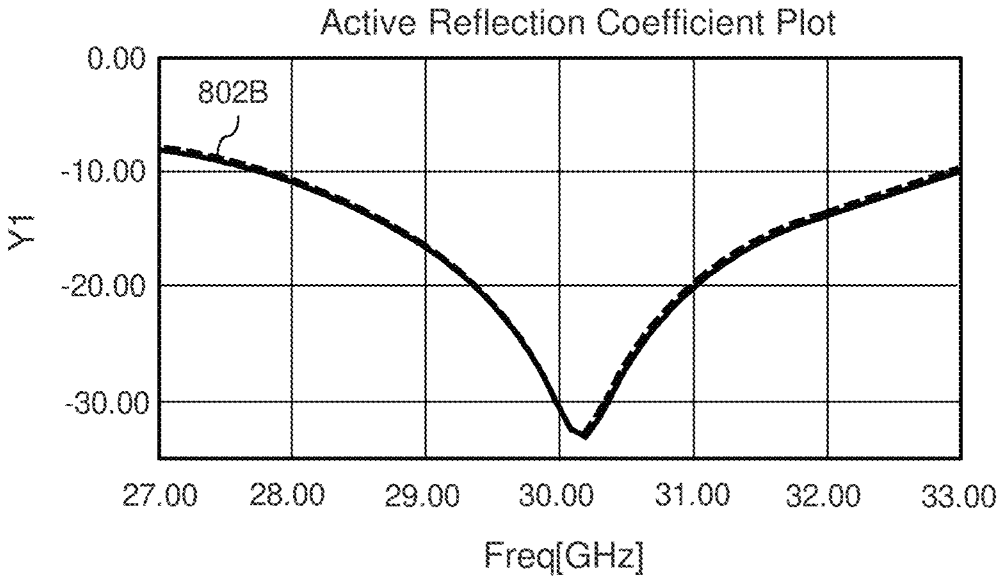
FIG. 8B depicts an example reflection coefficient plot according to example aspects of the present disclosure.

FIG. 8B depicts an example reflection coefficient plot 802B according to example aspects of the present disclosure. FIG. 8B plots frequency along the horizontal axis and reflection coefficient (S 11) along the vertical axis.

Figure 8C:
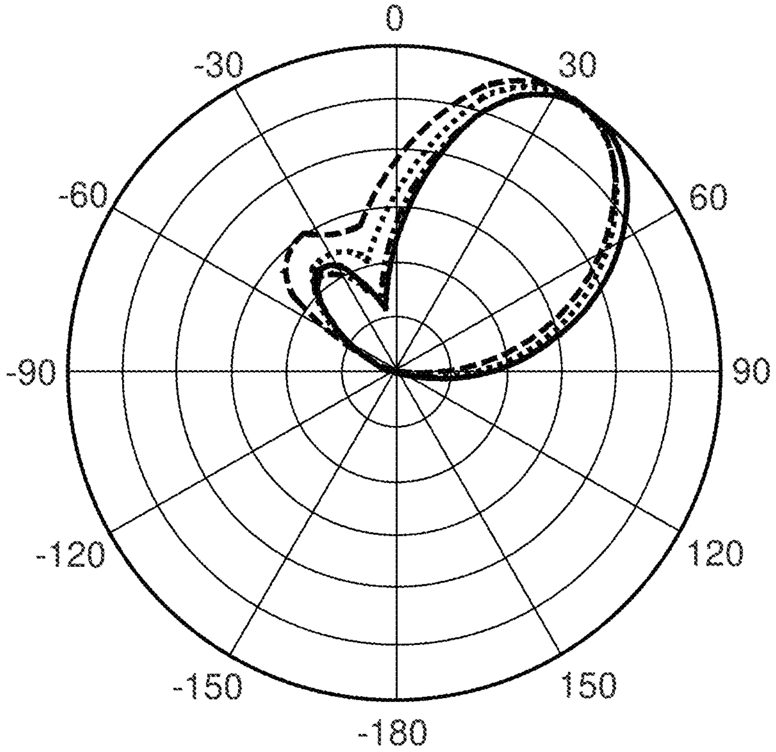
FIG. 8C depicts example radiation patterns of normal realized gain in the YZ plane at a frequency of, for instance, 31 GHz.

FIG. 8C depicts example radiation patterns 802C of normal realized gain in the YZ plane at a frequency of, for instance, 31 GHz.

Figure 9:
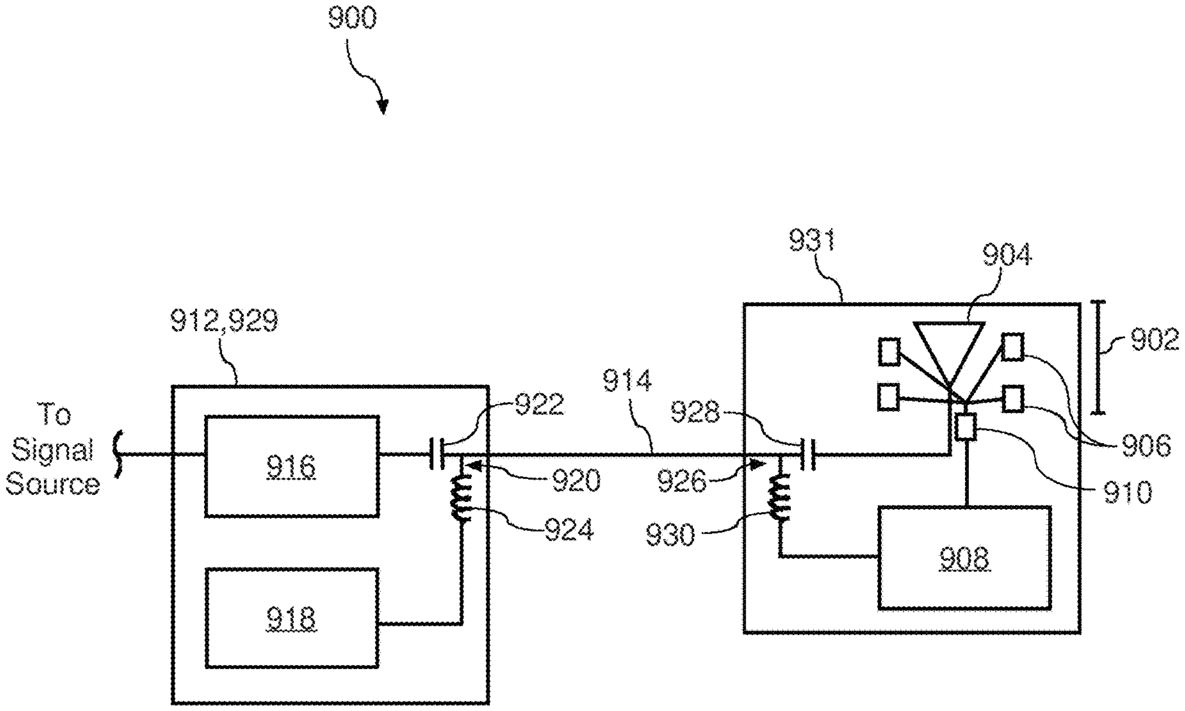
FIG. 9 depicts a schematic diagram of an embodiment of an antenna assembly in accordance with example aspects of the present disclosure.

FIG. 9 illustrates a schematic diagram of an embodiment of an antenna system 900 in accordance with example aspects of the present disclosure. The antenna system 900 may include a modal antenna assembly 902. The modal antenna assembly 902 may include a active patch antenna element 904 and a plurality of parasitic patch elements 906 positioned proximate to the active patch antenna element 904 (such as the assembly illustrated in FIG. 1 and/or FIG. 9). The modal antenna assembly 902 may be operable in a plurality of different modes, and each mode may be associated with a different radiation pattern.

A control circuit, such as tuning circuit 908 (e.g., a control circuit), may be configured to control an electrical characteristic associated with the parasitic patch elements 906 to operate the modal antenna assembly 902 in the plurality of different modes. The tuning circuit 908 may be configured demodulate a control signal from a transmit signal and control the electrical characteristic of the parasitic patch elements 906 based on control instructions associated with the control signal.

A switching circuit 910 may be coupled with the parasitic patch elements 906, and the tuning circuit 908 may be configured to control the switching circuit 910 to alter the electrical connectivity of the parasitic element 906 with a voltage or current source or sink, such as connecting the parasitic element 906 with a ground plane (e.g., ground plane 102B of FIG. 1B).

A radio frequency circuit 912 may be configured to transmit an RF signal to the active patch antenna element 904 of the modal antenna assembly 902. For example, a transmission line 914 may couple the radio frequency circuit 910 to the modal antenna assembly 902. In some embodiments, the transmission line 914 may be a single coaxial cable configured to provide data over coaxial functionality. The radio frequency circuit 912 may be configured to amplify or otherwise generate the RF signal, which is transmitted through the transmission line 914 (as a component of the transmit signal) to the active patch antenna element 904 of the modal antenna assembly 902.

In some embodiments, the radio frequency circuit 912 may include a front end module 916 and/or a control instruction circuit 918. The front end module 916 may be configured to generate and/or amplify the RF signal that is transmitted to the active patch antenna element 904. The control instruction circuit 918 may be configured to modulate a control signal onto the RF signal using amplitude-shift keying modulation to generate the transmit signal.

The transmission line 914 may be coupled with various components (e.g., using Bias Tee circuits) that are configured to aid in the combination and/or separation of signals occupying various frequency bands. For example, a first Bias Tee circuit 920 may couple the front end module 916 and the control instruction circuit 918 with the transmission line 914. The first Bias Tee circuit 920 may include a capacitor 922 coupling the transmission line 914 with front end module 916 and an inductor 924 coupling the control instruction unit 918 with the transmission line 914. A second Bias Tee circuit 926 may couple the active patch antenna element 904 and the tuning circuit 908 with the transmission line 914. The second Bias Tee circuit 926 may include a capacitor 928 coupling the transmission line 914 with the active patch antenna element 904 and an inductor 930 coupling the transmission line 914 with the tuning circuit 908.

The front end module 916 may transmit the RF signal through the capacitor 922 of the first Bias Tee circuit 920. The control circuit 918 may modulate the control signal onto the RF signal through the inductor 924 of the first Bias Tee circuit 120 to generate the control signal in the transmission line 914. The tuning circuit 908 may de-modulate the control signal from the transmit signal via the inductor 930 of the second Bias Tee circuit 928. The RF signal component of the transmit signal may be transmitted to the active patch antenna element 904 of the modal antenna 902 via the capacitor 928 of the second Bias Tee circuit 928.

In some embodiments, the antenna system 900 may include a first circuit board 929 and a second circuit board 931 that is physically separate from the first circuit board 929. The radio frequency circuit 912 may be disposed on the first circuit board 929, and at least one of the tuning circuit 908 or modal antenna assembly 902 may be disposed on the second circuit board 931. This may allow radio frequency circuit 912 to be physically separated from the tuning circuit and/or modal antenna assembly 902 without employing multiple transmission lines or adversely affecting the operation of the antenna system 900.

In some embodiments, the RF signal may be defined within a first frequency band, and the control signal may be defined within a second frequency band that is distinct from the first frequency band. For example, the first frequency band may range from about 500 MHz to about 50 GHz, in some embodiments from about 1 GHz to about 25 GHz, in some embodiments from about 2 GHz to about 7 GHz, e.g., about 5 GHz. The second frequency band may range from about 10 MHz to about 1 GHz, in some embodiments from about 20 MHz to about 800 MHz, in some embodiments from about 30 MHz to about 500 MHz, in some embodiments from about 50 MHz to about 250 MHz, e.g., about 100 MHz. More generally, the frequency bands defined by the RF signal may be millimeter wave frequency bands.

Figure 10:
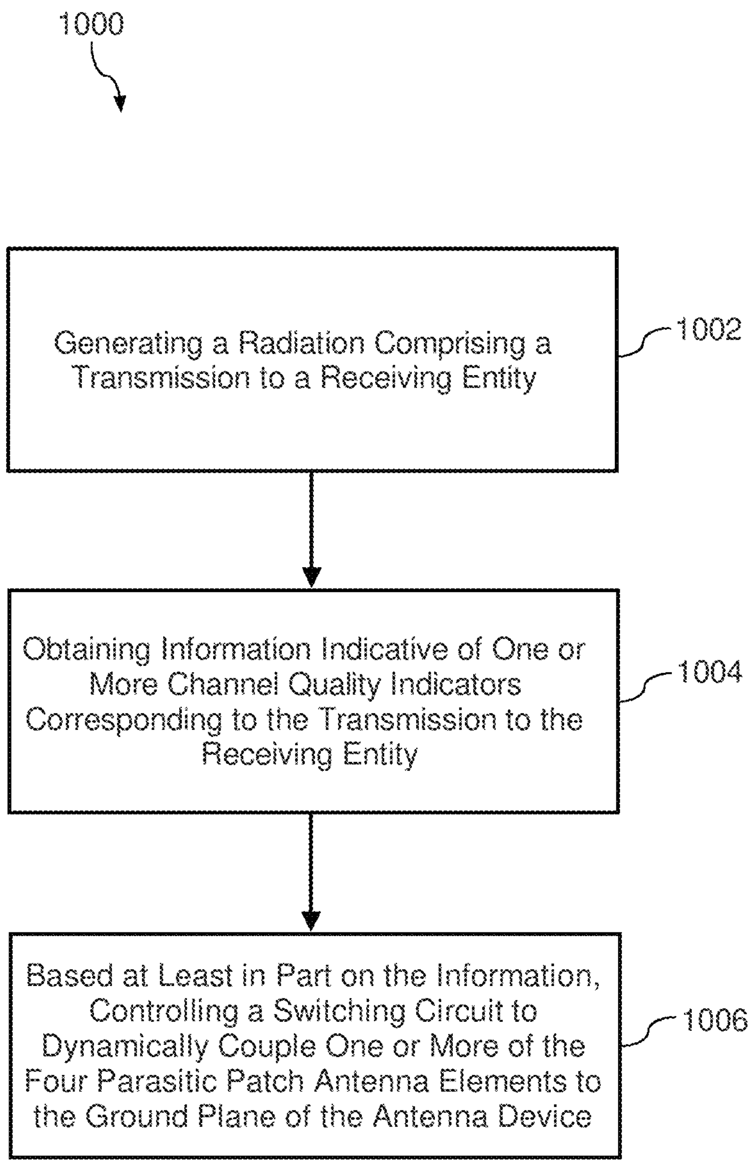
FIG. 10 is a flowchart illustrating an example method for active steering for millimeter wave signaling according to some embodiments of the present disclosure.

FIG. 10 is a flowchart illustrating an example method 1000 for active steering for millimeter wave signaling according to some embodiments of the present disclosure. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, an antenna device can generate a radiation pattern (e.g., between −24 Ghz and −300 Ghz) that includes a transmission to a receiving entity (e.g., a second antenna device, etc.). The antenna device can include a substrate, a ground plane contacting a first surface of the substrate, and an active antenna patch element and four parasitic patch elements disposed upon a second surface of the substrate. The active antenna patch element can define four corners, and each of the four parasitic patch elements can be positioned coplanar and adjacent to a respective corner of the four corners of the active antenna patch element.

At 1004, the antenna device can obtain information via a single coaxial cable (e.g., utilizing data over coaxial transmission, etc.). The information can indicate one or more channel quality indicators (CQIs) associated with the transmission to the receiving entity. For example, the CQIs may indicate a quality of connection between the antenna device and the receiving entity.

At 1006, based at least in part on the information, the antenna device can control a switching circuit to dynamically couple one or more of the four parasitic patch antenna elements to the ground plane of the antenna device. For example, the information indicative of the CQI(s) may indicate a poor transmission quality between the antenna device and the receiving entity. In response, the antenna device may control the switching circuit to dynamically couple one or more of the parasitic patch elements to the ground plane, therefore shaping the radiation pattern to increase transmission quality.

One example Size of patch is 6 mm to 18 mm.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna configured to operate at millimeter wave frequencies, the antenna comprising:

a substrate comprising a first surface and a second surface;

a ground plane, wherein a first surface of the ground plane contacts the second surface of the substrate;

an active patch antenna element that defines a first corner, a second corner, a third corner, and a fourth corner, wherein the active patch antenna element is positioned on the first surface of the substrate, wherein the active patch antenna is configured to generate a radiation pattern;

a first parasitic patch element coplanar to the active patch antenna element, wherein a corner of the first parasitic patch element is adjacent to the first corner of the active patch antenna element;

a second parasitic patch element coplanar to the active patch antenna element, wherein a corner of the first parasitic patch element is adjacent to the second corner of the active patch antenna element;

a third parasitic patch element coplanar to the active patch antenna element, wherein a corner of the first parasitic patch element is adjacent to the third corner of the active patch antenna element;

a fourth parasitic patch element coplanar to the active patch antenna element, wherein a corner of the first parasitic patch element is adjacent to the fourth corner of the active patch antenna element;

a switching circuit configured to dynamically couple, to the ground plane, the first parasitic patch element, the second parasitic patch element, the third parasitic patch element, and/or the fourth parasitic patch element; and a control circuit configured to control the switching circuit to dynamically couple the first, second, third, and/or the fourth parasitic patch elements to the ground plane based at least in part on one or more channel quality indicators (CQIs), wherein the one or more CQIs are indicative of a quality of connection between the antenna and one or more receiving entities, wherein the control circuit receives data over a single coaxial cable.

2. The antenna of claim 1, wherein the first, second, third, and fourth parasitic patch elements are respectively within a distance of the first, second, third and fourth corners of the active patch antenna elements.

3. The antenna of claim 2, wherein the distance comprises a maximum distance of $$\frac{\lambda}{2}.$$

4. The antenna of claim 1, wherein the data over the single coaxial cable is descriptive of control instructions for the control circuit.

5. The antenna of claim 1, wherein each of the first, second, third, and fourth parasitic patch elements are configured to reflect the radiation pattern of the active patch antenna element when disconnected from the ground plane.

6. The antenna of claim 1, wherein the one or more CQIs are associated with a connection between the antenna and a receiving entity positioned closest to the first and third parasitic patch elements; and wherein, responsive to the one or more CQIs, the control circuit is configured to control the switching circuit to dynamically couple the first and third parasitic patch elements to the ground plane.

7. The antenna of claim 1, wherein:

the antenna further comprises a second active patch antenna element configured to generate a second radiation pattern positioned on the first surface of the substrate, wherein a first corner and a second corner of the second active patch antenna element are respectively adjacent to the third corner and the fourth corner of the active patch antenna element;

wherein the third parasitic patch element is adjacent to a third corner of the second active patch antenna element; and wherein the fourth parasitic patch element is adjacent to a fourth corner of the second active patch antenna element.

8. The antenna of claim 1, wherein a shape of the first parasitic patch antenna element is identical to a shape of the second parasitic patch antenna element, the third parasitic patch antenna element, and the fourth parasitic patch antenna element.

9. The antenna of claim 1, wherein the radiation pattern comprises a frequency between about 24 Ghz and about 300 Ghz.

10. An antenna configured to operate at millimeter wave frequencies, the antenna comprising:

a substrate comprising a first surface and a second surface;

a ground plane, wherein a first surface of the ground plane contacts the second surface of the substrate;

a plurality of active patch antenna elements disposed upon the first surface of the substrate, wherein the plurality of active patch antenna elements collectively form a two-dimensional shape defining a plurality of vertices, wherein each of the plurality of active patch antenna elements is configured to generate a radiation pattern;

a plurality of parasitic patch elements coplanar to the plurality of active patch antenna elements, wherein each of the plurality of parasitic patch elements defines four vertices, wherein a vertex of each of the plurality of parasitic patch antenna elements is adjacent to a vertex of the two-dimensional shape of the plurality of active patch antenna elements;

a switching circuit configured to dynamically couple, to the ground plane, one or more of the plurality of parasitic patch elements; and a control circuit configured to control the switching circuit to dynamically couple the first, second, third, and/or the fourth parasitic patch elements to the ground plane based at least in part on one or more channel quality indicators (CQIs), wherein the one or more CQIs are indicative of a quality of connection between the antenna and one or more receiving entities, wherein the control circuit receives data over a single coaxial cable.

11. The antenna of claim 10, wherein the plurality of active patch antenna elements comprises a first active patch antenna element and a second active patch antenna element, wherein the first active patch antenna element located separately from the second active patch antenna element, and wherein distance between the first active patch antenna element and the second active patch antenna element is less than $$\frac{\lambda}{2}.$$

12. A method for generation of millimeter wave frequencies, the method comprising:

generating, by an antenna device, a radiation pattern comprising a transmission to a receiving entity, wherein the antenna device comprises a substrate, a ground plane contacting a first surface of the substrate, and an active antenna patch element and four parasitic patch elements disposed upon a second surface of the substrate, wherein the active antenna patch element defines four corners, and wherein each of the four parasitic patch elements are positioned coplanar and adjacent to a respective corner of the four corners of the active antenna patch element;

obtaining, by an antenna device via a single coaxial cable, information indicative of one or more channel quality indicators corresponding to the transmission to the receiving entity; and based at least in part on the information, controlling, by the antenna device, a switching circuit to dynamically couple one or more of the four parasitic patch antenna elements to the ground plane of the antenna device, wherein the information comprises one or more channel quality indicators (CQIs) and the one or more CQIs are indicative of a quality of connection between the antenna and one or more receiving entities.

* * * * *